United States Patent [19]

Savoy

[11] 3,844,165
[45] Oct. 29, 1974

[54] END AREA INSPECTION TOOL FOR AUTOMATED NONDESTRUCTIVE INSPECTION

[75] Inventor: Donald Edward Savoy, Lake Charles, La.

[73] Assignee: AMF Incorporated, White Plains, N.Y.

[22] Filed: Oct. 3, 1973

[21] Appl. No.: 403,061

[52] U.S. Cl. ............................................. 73/67.8 S
[51] Int. Cl. .......................................... G01n 29/04
[58] Field of Search ........ 73/67.5 R, 67.8 S, 71.5 N; 324/37

[56] References Cited
UNITED STATES PATENTS
3,350,925   11/1967   Coy ................................ 73/67.8 S X
3,766,775   10/1973   Gnunkel ............................ 73/67.8 S

*Primary Examiner*—James J. Gill
*Attorney, Agent, or Firm*—George W. Price; John H. Gallagher

[57] ABSTRACT

Nondestructive inspection apparatus is mounted on a freestanding housing unit having motorized wheels for driving the housing unit around the circumference of a ferromagnetic pipe. The housing unit includes an electromagnet and pole pieces which are slightly spaced from the surface of the pipe to establish a magnetic circuit with the pipe, thereby producing an attractive force that holds the wheels of the housing unit against the pipe surface, irrespective of the location of the unit on the pipe circumference. The axles for the wheels are canted to produce an axial force tending to move the apparatus away from the end of the pipe as the wheels rotate. Follower means on the apparatus movably engage the end of the pipe and resists said force to hold the apparatus at the end of the pipe as it rotates thereabout. The nondestructive inspection apparatus inspects the end region of the pipe as the housing rotates about the pipe.

5 Claims, 3 Drawing Figures

END AREA INSPECTION TOOL FOR AUTOMATED NONDESTRUCTIVE INSPECTION

BACKGROUND OF THE INVENTION

In the manufacture of seam welded pipe and tubular goods, flat sheets of steel first are produced at a steel mill. These sheets then are cut to size, shaped into tubular form, and welded along a seam to form the closed tubular product. The ultimate use of the tubular products thus produced may be in a pipeline, for example, where successive lengths are joined end to end by girth welds. Industry standards require that the end regions of the pipes where the welds are formed must be free of potentially injurious anomalies such as laminar type defects so that high quality girth welds may be made. However, in the manufacture of the steel sheets from which the pipe is formed, laminar type defects sometimes are created and may occur in the end region of a pipe where a girth weld is to be made.

In the past, end area inspection apparatus has included a spider or clamping means which clamped to the end of a tubular member and supported a central rod which extended into the end of the member. An inspection head or transducer was supported at the inner end of the rod. The rod and inspection head was rotated by hand or by motor means attached to the outer end of the rod. This apparatus was somewhat cumbersome to handle and required set up and take down time and effort.

It therefore is desirable that the inspection apparatus be small and easy to handle, and be reliable and versatile in operation.

SUMMARY OF THE INVENTION

Nondestructive inspection apparatus is provided for detecting anomalies in the end area of a tubular member of ferromagnetic material. The apparatus includes a housing member mounted on power driven wheels so that it may be rotated about the inner or outer circumference of the tubular member. The housing member includes an electromagnet and pole pieces which are slightly spaced from the surface of the tubular member so as to establish a magnetic attraction force that holds the housing member on the steel tubular member as it rotates about the circumference of the pipe. Nondestructive inspection apparatus, such as an ultrasonic inspection transducer, is carried by the housing member and is operated to perform ultrasonic inspection of the end area of the tubular member as the housing member rotates about the circumference.

In accordance with the present invention, the wheels on the housing member are slightly canted or toed in relative to the end of the tubular member so that as the unit rotates an axial force is produced which tends to urge the housing member axially away from the open end of the tubular member. Follower means which engage the end surface of the tubular member resists the axial force and allows the housing to rotate about the end areas without moving axially and without dropping out of the end region of the member. Once the apparatus is placed in the end region of a tubular member it is held on the pipe by the magnetic attractive force and rotates about the end of the tubular member and performs its inspection operation unassisted by a human operator.

DETAILED DESCRIPTION OF PREFERRED EMBODIMENT

Figure 1:
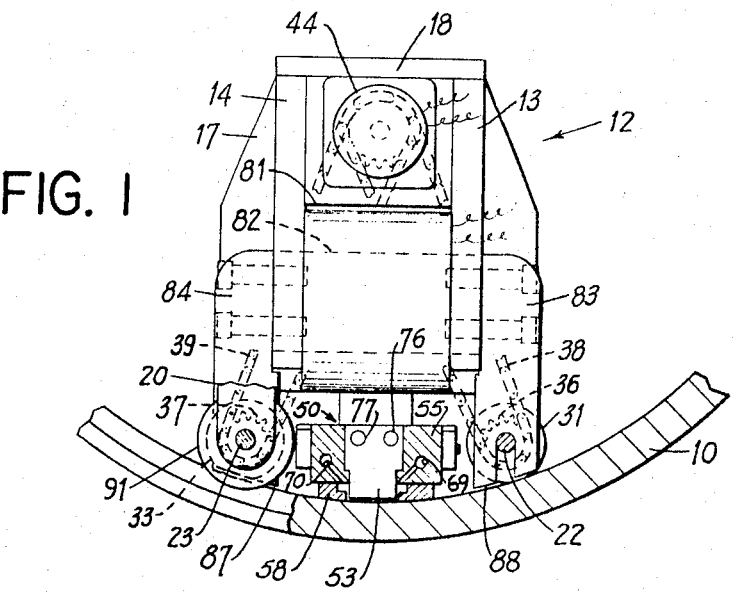
FIGS. 1-3 are, respectively, partial end sectional, partial side elevational, and bottom views illustrating end area inspection apparatus incorporating the present invention.
Figure 2:
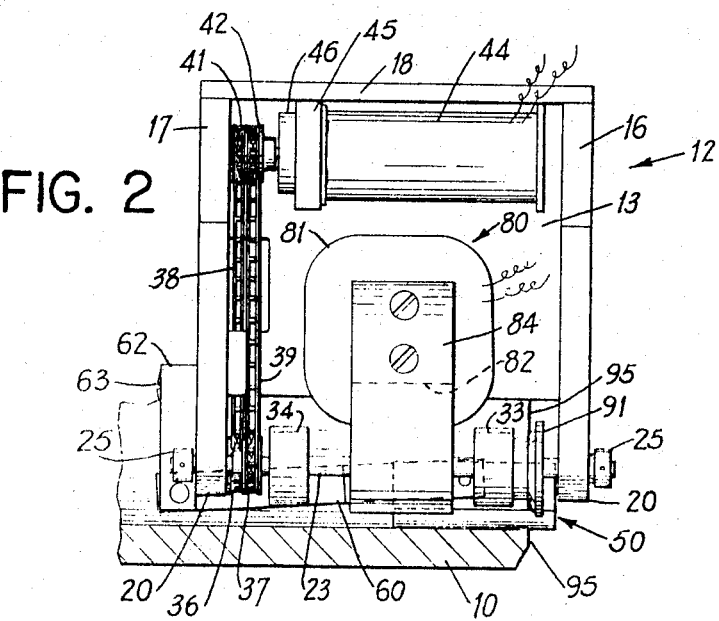
Figure 3:
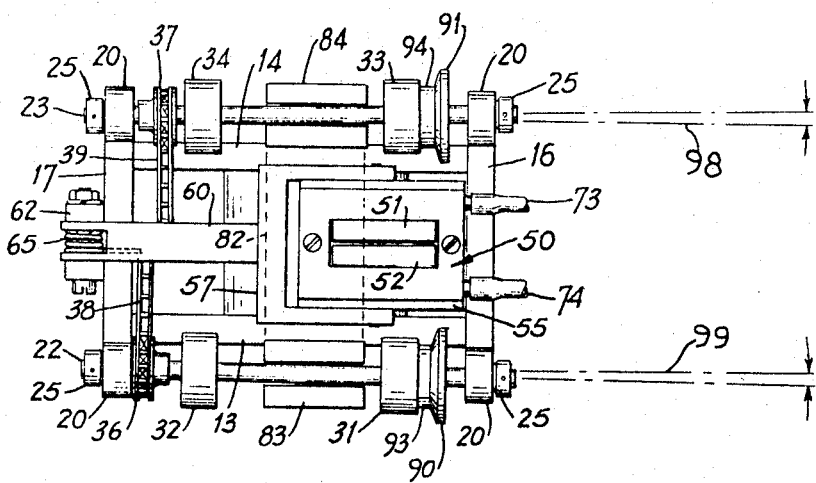

Referring in detail to FIGS. 1-3, the end region of a ferromagnetic pipe 10 is to be inspected for anomalies. As illustrated, the end of pipe 10 is beveled to facilitate the making of a girth weld. The apparatus of this invention is comprised of a housing unit 12 formed of side plates 13 and 14, end plates 16 and 17, and a top plate 18. Desirably, all of the above-mentioned plates are made from a nonmagnetic material such as aluminum.

The bottoms of end plates 16 and 17 have rounded legs 20 which extend downwardly from the corners thereof. The legs 20 are apertured to form bushings that receive axles 22 and 23 which extend through the bushings. Axles 22 and 23 are made of nonmagnetic materials and are held in position by means of collars 25 which are secured to the ends of the axles by suitable means such as set screws. Rollers or wheels 31, 32 and 33, 34 are respectively secured to and rotate with axles 22 and 23 and support housing unit 12 on the inner surface of pipe 10. Wheels 31-34, or at least the outer portions thereof, are made of a plastic material such as polyurethane to provide a good gripping surface with the pipe 10.

Axles 22 and 23 also have secured thereto respective chain sprockets 36 and 37 which engage respective drive chains 38 and 39. As best seen in FIG. 2, the chains are driven from sprockets 41 and 42 mounted on the drive shaft of motor 44. The motor is secured to a mounting bracket 45, and may have a gear reduction mechanism 46 associated with it. It may be seen that rotation of the drive shaft of motor 44 drives axles 22 and 23 and wheels 31-34 to cause housing unit 12 to rotate circumferentially on the inner surface of pipe 10. As will be explained below, means are provided for causing housing unit 12 to rotate through a full 360° circumferential path around pipe 10 without any auxiliary supporting structure.

To provide nondestructive inspection of the end area of pipe 10 as the housing unit rotates thereabout, housing unit 12 carries an inspection head 50, FIGS. 1 and 3, which in this instance is illustrated to be ultrasonic inspection apparatus. As illustrated in the bottom view of FIG. 3, inspection head 50 may include two ultrasonic crystal transducers 51 and 52 which are supported in a plastic casing 53, FIG. 1. Still referring to FIG. 1, casing 53 is held in a frame 55 that is supported in a gimbal or clevis 57 in a manner to permit a shaped, apertured wear plate 58 to make good contact with the inner surface of pipe 10. As seen best in FIG. 2 and 3, clevis 57 is supported at the end of an arm 60 which in turn is pivotally secured to a bracket member 62 that is attached by bolts 63 to end plate 17. A torsion spring 65 urges arm 60 downwardly to hold wear plate 58 in good contact with the surface of pipe 10.

Support frame 55, FIG. 1, includes fluid passages 69 and 70 which are in communication with flexible hoses 73 and 74, FIG. 3, to supply an ultrasonic coupling liquid such as water to the void space between the crystal transducers 51 and 52 and the inner surface of pipe 10.

Electrical connectors 76 and 77, FIG. 1, are attached to the inspection head to provide electrical connection to the crystal transducers. Inspection head 50 may include two crystal transducers 51, 52, as illustrated, or it may include just one crystal. The ultrasonic apparatus itself may be commercially available apparatus and its specific design and operation is not the subject of the present invention.

The above-mentioned means for permitting housing unit 12 to rotate completely about the inner circumference of pipe 10 without auxiliary support means includes an electromagnet 80 comprised of solenoid 81, core 82, and removable pole pieces 83 and 84. As seen in FIG. 3, the bottoms of pole pieces 83 and 84 are forked to permit axles 22 and 23 to pass therethrough. As seen in FIGS. 1 and 2, pole pieces 83 and 84 are shaped and arranged to provide uniform narrow air gaps 87, 88 between their bottom surfaces and the inner surface of pipe 10. It is seen that core 82, pole pieces 83 and 84, and the portion of ferromagnetic pipe 10 between the pole pieces constitutes a magnetic circuit that is substantially closed except for the very narrow air gaps 87 and 88. This magnetic circuit provides an attractive force that maintains wheels 31-34 against the surface of pipe 10 but yet allows the nonmagnetic wheels to be driven to move the housing unit. The strength of electromagnet 80 and the characteristics of the magnetic circuit are proportioned so as to provide a sufficiently strong magnetic attractive force to hold the wheels against the pipe surface throughout the full 360° rotation of the housing unit 12 about the circumference of pipe 10.

In the rotation of housing unit 12 about pipe 10 there may be some tendency for the unit to move parallel to the axis of the pipe, either inwardly away from the end region, or outwardly in which case it might fall out of the open end of the pipe. To prevent this axial movement, follower means such as washers 90 and 91 are secured to axles 22 and 23, respectively. Follower washers 90 and 91 are larger in diameter than wheels 31-33 and are spaced from respective wheels 31 and 33 by spacer washers 93 and 94. The spacing is chosen so that when follower washers 90 and 91 overhang the end 95 of pipe 10 the inspection head 50 is properly positioned to inspect the end region of the pipe. Furthermore, axles 22 and 23 are not parallel to the axis of pipe 10 and are not parallel to each other, but each is slightly canted or toed in, as illustrated in FIG. 3, by a small angle relative to lines 98 and 99 which are parallel to the axis of a pipe being inspected. The two axles are oppositely canted away from the parallel so that for either the clockwise or counterclockwise direction of rotation about pipe 10, the canted wheels will tend to cause housing unit 12 to move farther into the pipe, i.e., to the left as in FIG. 2. However, because follower washers 90 and 91 are movably engaged with the end of the pipe, they prevent axial movement of the housing unit as it rotates about the pipe. The unit therefore follows around a circular path on the inner surface of the pipe when motor 44 is actuated to drive wheels 31-34.

In the use of the inspection apparatus it is desirable that motor 44 be a reversable motor so that it may make one traversal around the pipe in one direction and the next rotation in the opposite direction. This prevents the electrical leads and cables, and water tubes 73 and 74 from becoming twisted.

The apparatus just described is versatile and one basic device may readily be adapted to inspect the end regions of pipes and tubes of different diameters, and may inspect the end or edge regions of flat plate material. Referring to FIGS. 1 and 2 it may be seen that pole pieces 83 and 84 are removably secured to core 82 by means of bolts or screws. It also is seen that the bottom surfaces of the pole pieces are shaped to provide a uniformly narrow air gap between them and the inner surface of pipe 10. In practice, a number of pairs of pole pieces having different contours at their bottoms will be available so that many different sized pipe may be inspected merely by placing a respective appropriately shaped pair of pole pieces in the magnetic circuit with core 82. In this manner, uniformly narrow air gaps 87 and 88 are assured. When inspecting flat plate material, the bottoms of pole pieces 83 and 84 would, of course, be flat and parallel to the surface of the sheet. When inspecting different size pipe or flat sheet, it may or may not be required that the shaped wear plate 58 on inspection head 50 be changed so that it too will be compatible with the surface being inspected. Pole pieces 83 and 84 also may be shaped so that housing unit 12 may move about the outer surface of a tubular member rather than the inner surface as illustrated.

The inspection apparatus of this invention is extremely versatile and simple to use. The apparatus is relatively light in weight and is easily handled by one man. Once it is placed at the end region of a pipe with follower washers 91 and 92 engaged with the end of pipe 10, the operator need not attend it except to reverse the direction of rotation of motor 44 in order to reverse the direction of rotation of the apparatus on successive rotations, and even this may be accomplished automatically with relatively simple switching apparatus if desired. The operator may stop the inspection apparatus at any position along its circumferential path and may reverse its direction to double check any region of particular interest. Because the apparatus is freestanding or self supporting on the surface of the object to be inspected, its use considerably shortens the time required to inspect each end region. This is to be contrasted with known apparatus which is not freestanding on the inner surface of the pipe, for example, but is supported by auxiliary equipment such as clamps and spiders which must be attached to and removed from the end of each pipe being inspected. The prior art apparatus also often involved rather cumbersome drive means.

Although the apparatus described above presently is the preferred embodiment of the invention, alternative embodiments thereof are possible. For example, in place of electromagnet 80, FIG. 2, a permagnet may be used if space and weight requirements permit. Additionally other inspection techniques such as eddy current or flux leakage inspection may be employed instead of ultrasonic. In the case of flux leakage inspection, a magnetic flux field already is present in the wall of pipe 10 due to electromagnet 80 and pole pieces 83 and 84. Inspection head 50 in that case would be a search coil, as is standard practice.

The apparatus described above is claimed in its broader aspects in the concurrently filed application Ser. No. 402,989, by John M. Romere, entitled "End Area Inspection Tool for Automated Nondestructive Inspection," and assigned to applicant's assignee. My invention claimed herebelow is in the improved means for maintaining the apparatus at a fixed distance from the end of the pipe by means of the canted axles and wheels and the follower washers.

What is claimed is:

1. In nondestructive inspection apparatus for inspecting the end region of a ferromagnetic member wherein the apparatus includes a freestanding housing unit having driven wheels or rollers thereon for supporting and moving the unit on the surface of the member, the unit including nondestructive inspection means and magnet means on the unit for establishing a magnetic circuit with the member to produce an attractive force therebetween which is sufficient in magnitude to maintain the wheels or rollers on the surface irrespective of the disposition of the housing unit, and wherein means are included on the housing unit for moving it along a desired path a fixed distance from an end of the member, an improvement in said last named means comprising, an axle on which at least one of said rollers or wheels is supported, said axle being obliquely inclined with respect to a line that is normal to said desired path, whereby rotation of said one roller or wheel in a given direction creates a force tending to move the housing unit away from said end, and said housing unit including follower means engaging said end of the member for resisting said force and maintaining the housing unit on the desired path.

2. The improvement claimed in claim 1 further including, a second axle spaced from said first axle and being oppositely inclined relative to said normal line, at least one other of said wheels or rollers supported on the second axle, whereby rotation of said wheels or rollers in a direction opposite to said given direction also produces a force tending to move the housing unit away from said end of the member.

3. The improvement claimed in claim 1 wherein the follower means comprises means mounted on said axle for engaging said end of the member, said means mounted on the axle comprising circular washer means having a diameter greater than said wheel or roller, whereby the peripheral portion of the washer will extend over the edge of and contact said end of the member.

4. In nondestructive inspection apparatus for inspecting an end region of a cylindrically shaped ferromagnetic member by use of a housing unit having wheels thereon for supporting and moving the unit circumferentially about a surface of the member in a freestanding manner, the housing unit including nondestructive inspection means and magnet means for establishing a magnetic circuit with the member to produce a magnetic attractive force therebetween which is sufficient in magnitude to maintain the wheels on the surface irrespective of the circumferential position of the unit on said surface, and wherein means are included on the housing unit for moving it along a desired path a fixed distance from an end of the member, an improvement in said last named means comprising, first and second spaced apart axles supporting respective ones of said wheels, said axles being non-parallel and oppositely canted or inclined relative to a line normal to said desired path to produce axial forces tending to move the housing unit inwardly on the member away from the end thereof irrespective of the direction of rotation of the wheels, and a follower washer on each of said axles adapted to overhang the end of said member to resist said forces and maintain the moving housing unit in a circular path about said member.

5. The improvement claimed in claim 4 wherein said axles are spaced farther apart at their ends closest the end of said member.

* * * * *